United States Patent
Simpson et al.

(10) Patent No.: US 10,712,558 B2
(45) Date of Patent: Jul. 14, 2020

(54) HEAD-UP DISPLAY DEVICE

(71) Applicants: DENSO International America, Inc., Southfield, MI (US); Denso Corporation, Kariya (JP)

(72) Inventors: Austin Simpson, Detroit, MI (US); Yusuke Matsui, West Bloomfield, MI (US); Keitaro Yoshioka, Farmington Hills, MI (US)

(73) Assignees: DENSO INTERNATIONAL AMERICA, INC., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/222,540

(22) Filed: Dec. 17, 2018

(65) Prior Publication Data

US 2020/0192090 A1    Jun. 18, 2020

(51) Int. Cl.
*G02B 27/01*      (2006.01)
*G02F 1/1335*     (2006.01)
*B60K 35/00*      (2006.01)

(52) U.S. Cl.
CPC ... *G02B 27/0101* (2013.01); *G02F 1/133528* (2013.01); *B60K 35/00* (2013.01); *B60K 2370/33* (2019.05); *B60K 2370/334* (2019.05); *G02B 2027/0118* (2013.01); *G02F 2001/133531* (2013.01)

(58) Field of Classification Search
CPC .............. G02B 27/01; G02B 27/0101; G02B 2027/0118; B60K 2027/0118; B60K 35/00; B60K 2370/33; B60K 2370/334; B60R 2300/205; G02F 1/133528; G02F 2001/133531
See application file for complete search history.

(56) References Cited

U.S. PATENT DOCUMENTS

| | | | |
|---|---|---|---|
| 10,114,217 B2 | 10/2018 | Seder et al. | |
| 2016/0306169 A1* | 10/2016 | Nambara | B60K 35/00 |
| 2017/0168338 A1* | 6/2017 | Bae | H01L 51/5253 |
| 2017/0329181 A1 | 11/2017 | Pierre | |

FOREIGN PATENT DOCUMENTS

| | | |
|---|---|---|
| JP | 2000131682 A | 5/2000 |
| JP | 2007065011 A | 3/2007 |
| WO | 2018015501 A1 | 1/2018 |

* cited by examiner

*Primary Examiner* — Jessica M Merlin
(74) *Attorney, Agent, or Firm* — Brooks Kushman P.C.

(57) ABSTRACT

A vehicle head-up display includes a liquid crystal panel, a light source, a first polarizing panel, and a second polarizing panel. The liquid crystal panel has opposing input and output surfaces. The liquid crystal panel is configured to form an image oriented relative to a horizontal axis. The light source is configured to direct light toward the input surface, through the liquid crystal panel, and out of the output surface to project the image onto an interior surface of a vehicle windshield. The first polarizing panel is secured to the output surface and has a first polarization axis oriented at a first angle relative to the horizontal axis. The second polarizing panel is disposed between the first polarizing panel and the windshield. The second polarizing panel has a second polarization axis oriented oriented at a second angle relative to the horizontal axis.

20 Claims, 6 Drawing Sheets

HEAD-UP DISPLAY DEVICE

TECHNICAL FIELD

The disclosure relates a head-up display (HUD) device for a vehicle.

BACKGROUND

A head-up display (HUD) device can be used in a vehicle to display a virtual image visually recognizable by a vehicle occupant. The virtual image can be projected from a projector and onto the windshield of the vehicle.

SUMMARY

A vehicle head-up display includes a liquid crystal panel, a light source, a first polarizing panel, and a second polarizing panel. The liquid crystal panel has opposing input and output surfaces. The liquid crystal panel is configured to form an image oriented relative to a horizontal axis. The light source is configured to direct light toward the input surface, through the liquid crystal panel, and out of the output surface to project the image onto an interior surface of a vehicle windshield. The first polarizing panel is secured to the output surface and has a first polarization axis oriented at a first angle in a counter-clockwise direction relative to the horizontal axis. The second polarizing panel is disposed between the first polarizing panel and the windshield. The second polarizing panel is oriented at a second angle in the counter-clockwise direction relative to the horizontal axis. A difference between the first angle and the second angle ranges between −45° and 80°.

A head-up display projector includes a liquid crystal panel, a light source, a first polarizing panel, and a second polarizing panel. The liquid crystal panel is configured to form an image oriented relative to a horizontal axis. The light source is configured to direct light through the liquid crystal panel to project the image. The first polarizing panel is secured to a first exterior surface of the liquid crystal panel. The first polarizing panel is disposed between the liquid crystal panel and an output of the projector. The first polarizing panel has a first polarization axis oriented at a first angle in a counter-clockwise direction relative to the horizontal axis. The second polarizing panel is disposed between the first polarizing panel and the output of the projector. The second polarizing panel is oriented at a second angle in the counter-clockwise direction relative to the horizontal axis. A difference between the first angle and the second angle ranges between −45° and 80°.

A vehicle head-up display includes a thin-film transistor liquid crystal display, a light source, a first polarizing panel, and a second polarizing panel. The thin-film transistor liquid crystal display is configured to form an image oriented relative to a first axis. The light source is configured to direct light through the display to project the image onto a windshield. The first polarizing panel overlays a first exterior surface of the display on an opposing side of the display relative to the light source. The first polarizing panel has a first polarization axis oriented at a first angle in a counter-clockwise direction relative to the first axis. The second polarizing panel is disposed between the first polarizing panel and the windshield. The second polarizing panel has a second polarization axis oriented at a second angle in the counter-clockwise direction relative to the first axis. A difference between the first angle and the second angle ranges between −45° and 80°.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
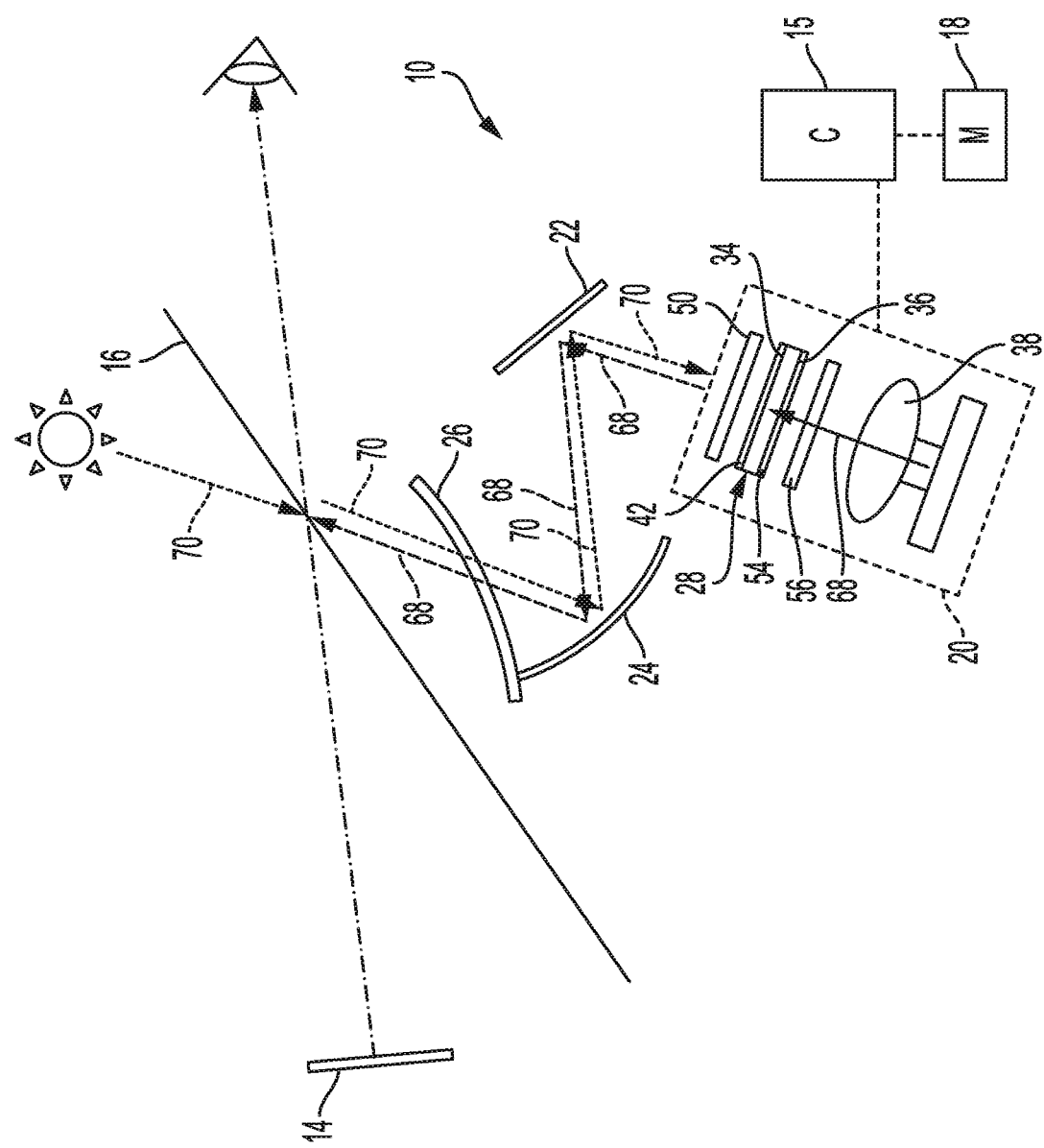
FIG. 1 is a schematic illustration of a head-up display device for a vehicle.

Referring to FIG. 1, a schematic illustration of a head-up display (HUD) unit or device 10 for a vehicle is illustrated. It should be understood that the position or scale of the HUD device 10 or any subcomponents thereof may be adjusted for illustrative purposes. The HUD device 10 may be situated within an instrument panel or dash board of a vehicle or automobile. The HUD device 10 projects an image onto a windshield 12 of the vehicle. The windshield 12 is configured to project the image as a virtual image 14 visually recognizable by a vehicle occupant. The virtual image 14 may include various information recognizable by vehicle occupant. Non-limiting examples of such information include vehicle state information, for instance, vehicle speed, fuel efficiency, remaining fuel, distance until empty, and average miles per gallon, and vehicle environment information, for instance, external temperature, internal temperature, weather information, road condition information, and navigation information.

HUD device 10 includes controller 15 configured to perform instructions, commands, and other routines stored in memory 18 to support the functionality of HUD device 10 as disclosed herein. The instructions, commands, and other routines performed by controller 15 may be stored in memory 18 in a non-volatile manner using any suitable processor-readable medium or storage, including any non-transitory medium. In one or more embodiments, the controller 15 is configured to execute instructions to transmit signals to an image projector 20. The image projector 20 is configured to convert the signals into an image and project the image onto the windshield 12. The image projector 20 may be configured to project the image onto the windshield 12 via one or more mirrors. For example, the image projector 20 may be configured to project the image onto the windshield 12 via a first mirror 22 and a second mirror 24. The first mirror 22 and the second mirror 24 may be flat mirrors, convex mirrors, concave mirrors, or any combination thereof. In the illustrated example, the first mirror 22 is a flat mirror while the second mirror 24 is a concave mirror. The one or more mirrors are configured to project the images through a medium and onto the windshield 16, which in turn, generates the virtual image 14. The medium may be an opening formed in a housing of the HUD device 10, a dust cover 26 of the HUD device 10, an instrument panel of the vehicle, or the dash board of the vehicle. Alternatively, the medium may be a transparent window mounted within the opening formed in the housing of the HUD device 10, the dust cover 26 of the HUD device 10, an instrument panel of the vehicle, or the dash board of the vehicle.

Figure 2:
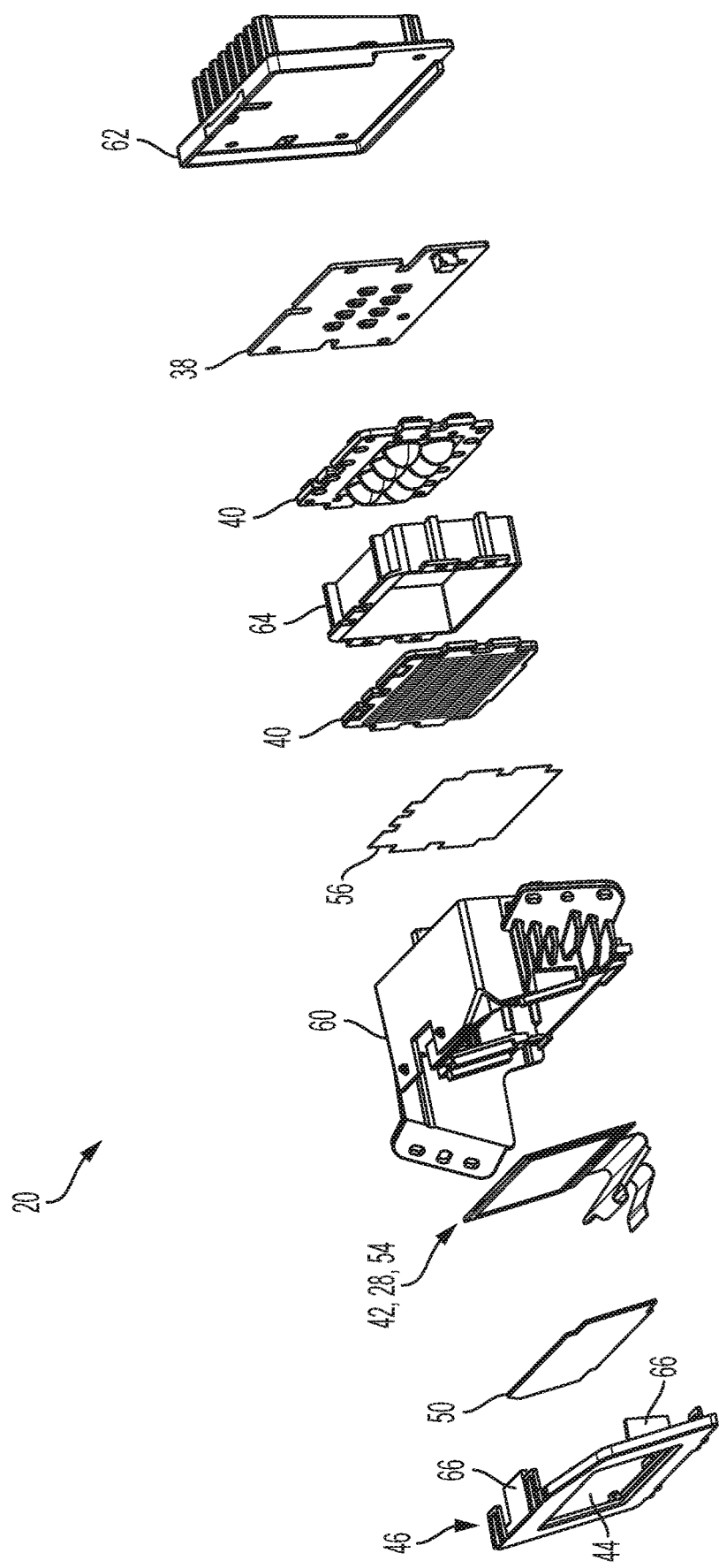
FIG. 2 is an exploded view of a projector for a head-up display device.
Figure 3:
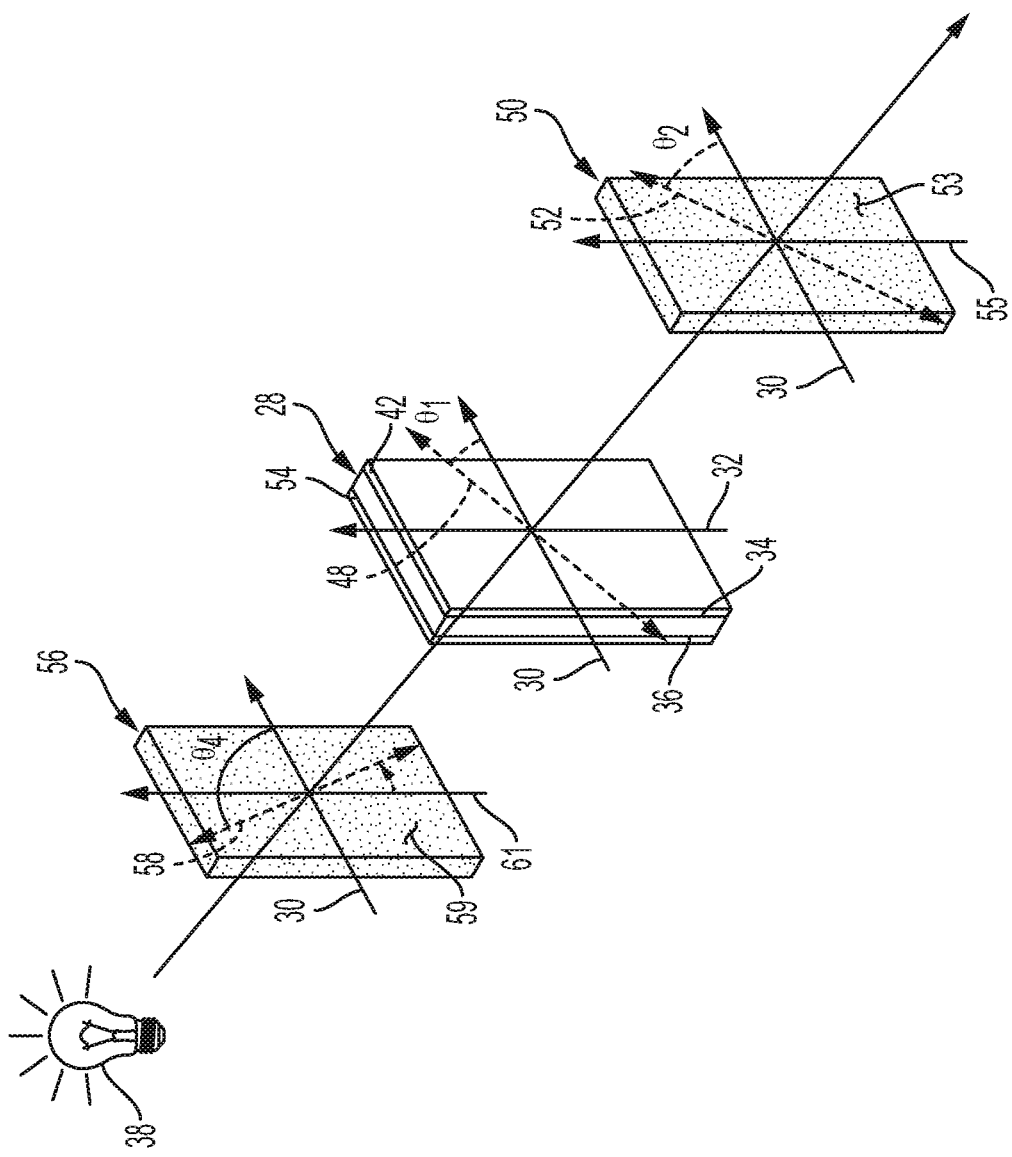
FIG. 3 illustrates the polarization axes of various polarizers that are utilized within the head-up display device.

Referring now to FIGS. 1-3, the HUD device 10, and particularly the image projector 20 of the HUD device 10, is described in further detail. The image projector 20 includes a liquid crystal panel 28 that is configured to form an image oriented relative to a first axis 30 and a second axis 32. The first axis 30 may be a horizontal axis while the second axis 32 may be a vertical axis. The liquid crystal panel 28 may be a thin-film transistor (TFT) liquid crystal panel. The liquid crystal panel 28 may have a first exterior surface 34 and a second exterior surface 36. The first exterior surface 34 may be referred to as an output surface while the second exterior surface 36 may be referred to as an input surface. The first exterior surface 34 and the second exterior surface 36 may be on opposing or opposite sides of the liquid crystal panel 28.

A light source 38 is configured to direct light toward the second exterior surface 36, through the liquid crystal panel 28, and out of the first exterior surface 34 to project the image generated by the liquid crystal panel 28 onto an interior surface of the vehicle windshield 16. The light source 38 may be any type of light source, such as an incandescent bulb or one or more light-emitting diodes (LEDs) that are secured to a circuit board (see FIG. 2) that may be controlled by the controller 15. One or more lenses 40 may be disposed between the liquid crystal panel 28 and the light source 38 in order to focus the direction of the light generated by the light source 38 toward the liquid crystal panel 28.

A first polarizing panel 42 is secured to the first exterior surface 34 (or output surface) of the liquid crystal panel 28. More specifically, the first polarizing panel 42 may overlay the first exterior surface 34 of the liquid crystal panel 28 on an opposing or opposite side of the liquid crystal panel 28 relative to the light source 38. The first polarizing panel 42 is disposed between the liquid crystal panel and an output of the projector 20. The output of the projector 20 may refer to an opening 44 defined by a housing component 46 of the projector 20. Housing component 46 may be a cover of the projector 20 that is disposed over the liquid crystal display 28. Light generated by the light source 38 may be directed out of the opening 44 in order to project the image generated by the liquid crystal display 28 onto the windshield 16. The first polarizing panel 42 has a first polarization axis 48 oriented at a first angle $\theta_1$ in the counter-clockwise direction relative to the first axis 30. The first polarization axis 48 is on the plane defined by the first axis 30 and second axis 32.

A second polarizing panel 50 is disposed between the first polarizing panel 42 and the windshield 16. The second polarizing panel 50 may be a subcomponent of the projector 20 or may be disposed outside of the projector 20 between the projector and the windshield 16. If the second polarizing panel 50 is a subcomponent of the projector 20, the second polarizing panel 50 may be disposed between the first polarizing panel 42 and the output of the projector 20 (i.e., the opening 44 defined by housing component 46). The second polarizing panel 50 has a second polarization axis 52 oriented at a second angle $\theta_2$ in the counter-clockwise direction relative to the first axis 30 along a plane defined by the external surface 53 of the second polarizing panel 50. The second polarization axis 52 and the external surface 53 may be on the plane defined by the first axis 30 and second axis 32. Alternatively, the second polarizing panel 50 may be rotated about the first axis 30 such that a third axis 55 that extends along the external surface 53 of the second polarizing panel 50 that is perpendicular to the first axis 30 does not align with the second axis 32. This rotation may be required to prevent sunlight reflecting off the polarizing panel and becoming visible to the vehicle occupant. In such an alternative embodiment, the external surface 53 and the second polarization axis 52 of the second polarizing panel 50 will be on a plane defined by the first axis 30 and the third axis 55.

The second polarizing panel 50 (that is disposed between liquid crystal panel 28 and the windshield 16) may or may not be mounted to a sheet or plate that is made from a translucent material (e.g., glass, clear plastic, etc). Mounting the second polarizing panel 50 to a translucent material adds rigidity to the second polarizing panel 50 allowing the second polarizing panel 50 to maintain its shape. The translucent material that has no inherent polarization/birefringence. Mounting the second polarizing panel 50 to a sheet or plate that is made from a translucent material that has no inherent polarization/birefringence, reduces the cost since the second polarization axis 52 of the second polarizing panel 50 will not need to be aligned with an additional polarization axis of the material that the second polarizing panel 50 is being mounted to.

A difference between the first angle $\theta_1$ and the second angle $\theta_2$ ranges between −45° and 80°. The difference between the first angle $\theta_1$ and the second angle $\theta_2$ may be referred to as the third angle $\theta_3$ and may be represented by equation (1):

$$\theta_3 = \theta_1 - \theta_2 \quad (1)$$

The first angle $\theta_1$ may have a value that ranges between −45° and 45° in the counter-clockwise direction relative to the first axis 30. The difference $\theta_3$ between the first angle $\theta_1$ and the second angle $\theta_2$ may more specifically range between −45° and 80° for values of the first angle $\theta_1$ that range between −45° and 45°. The difference $\theta_3$ between the first angle $\theta_1$ and the second angle $\theta_2$ may more specifically range between −10° and 80° for values of the first angle $\theta_1$ that range between −45° and 0°. The difference $\theta_3$ between the first angle $\theta_1$ and the second angle $\theta_2$ may more specifically range between −45° and 30° for values of the first angle $\theta_1$ that range between 0° and 45°.

A third polarizing panel 54 is secured to the second exterior surface 36 (or input surface) of the liquid crystal panel 28. More specifically, the third polarizing panel 54 may overlay the second exterior surface 36 of the liquid crystal panel 28 on the same side of the liquid crystal panel 28 relative to the light source 38 such that the third polarizing panel 54 is disposed between the light source 38 and the liquid crystal panel 28. The third polarizing panel 54 has a third polarization axis (not shown in FIG. 3) oriented at angle in the counter-clockwise direction relative to the first axis 30. The third polarization axis is substantially perpendicular to the first polarization axis 48. Substantially perpendicular may refer to any incremental value that ranges between exactly perpendicular and plus or minus 10°.

A fourth polarizing panel 56 is disposed between the third polarizing panel 54 and the light source 38. The fourth polarizing panel 56 has a fourth polarization axis 58 oriented at a fourth angle $\theta_4$ in the counter-clockwise direction relative to the first axis 30 along a plane defined by the external surface 59 of the fourth polarizing panel 56. The fourth polarization axis 58 is substantially parallel to the third polarization axis (i.e., the polarization axis of the third polarizing panel 54). Substantially parallel may refer to any incremental value that ranges between exactly parallel and plus or minus 10°. The fourth polarization axis 58 and the external surface 59 may be on the plane defined by the first axis 30 and second axis 32. Alternatively, the fourth polarizing panel 56 may be rotated about the first axis 30 such that a fourth axis 61 that extends along the external surface 59 of the fourth polarizing panel 56 that is perpendicular to the first axis 30 does not align with the second axis 32. In such an alternative embodiment, the external surface 59 and the fourth polarization axis 58 of the fourth polarizing panel 56 will be on a plane defined by the first axis 30 and the fourth axis 61.

The liquid crystal panel 28, first polarizing panel 42, second polarizing panel 50, third polarizing panel 54, fourth polarizing panel 56, lenses 40, and light source 38 may be disposed within housing component 60. Housing component 62 may be secured to a backside of housing component 60. More specifically, housing component 62 may be secured to a backside of housing component 60 via fasteners (not shown). Housing component 62 may be disposed adjacent to the light source 38 and may be a heat sink that includes fins to remove the heat generated by the light source 38. A spacer may be disposed between a first and a second of the lenses 40. Housing component 46 may be secured to a front side of housing component 60. More specifically, housing component 46 may include clips 66 that engage hosing component 60 to secure housing component 46 to housing component 60.

Overheating of a liquid crystal panel (e.g., liquid crystal panel 28) in a HUD device may lead to damage of the liquid crystal panel. Therefore, the amount of heat introduced to the liquid crystal panel is a factor that needs to be considered during the design process. Increasing the intensity of the light source 38 results in a brighter virtual image 14, which may be desirable, but also results in introducing additional heat to the liquid crystal display (See arrows 68 in FIG. 1 that represent the light that is being introduced to the liquid crystal display 28 from the light source 38 and then projected onto the windshield 16). Additional heat may be introduced to the liquid crystal display 28 by the Sun (See arrows 70 in FIG. 1 that represent the light that is being introduced to the liquid crystal display 28 from the Sun). The light that is being introduced to the liquid crystal display 28, and therefore the heat being introduced to the liquid crystal display 28, may be reduced through filters (i.e., any of the polarizing panels described above). The filters, however, should not reduce the brightness of the virtual image 14 such that it is difficult to see or unrecognizable to an occupant within the vehicle. Therefore, the filters (i.e., the polarizing panels described above) should be arranged to balance the brightness requirements of the virtual image 14 and the thermal load requirements of the liquid crystal display 28 (i.e., ensuring that the liquid crystal display 28 does not overheat).

The ranges of the difference $\theta_3$ between the first angle $\theta_1$ (i.e., the angle at which the first polarization axis 48 of the first polarizing panel 42 is oriented relative to the first axis 30) and the second angle $\theta_2$ (i.e., the angle at which the second polarization axis 52 of the second polarizing panel 50 is oriented relative to the first axis 30) described above were selected based on values that ensured that the thermal load introduced to liquid crystal display 28 resulted in a temperature increase of the liquid crystal display that remained below a temperature threshold. The ranges of the difference $\theta_3$ were also selected based on values that ensured that the light intensity of the virtual image 14 remained above light intensity thresholds in the visible light spectrum and for light that is further filtered outside of the HUD device 10 (e.g., p-wave light that is further filtered by polarized sunglasses).

Figure 4:
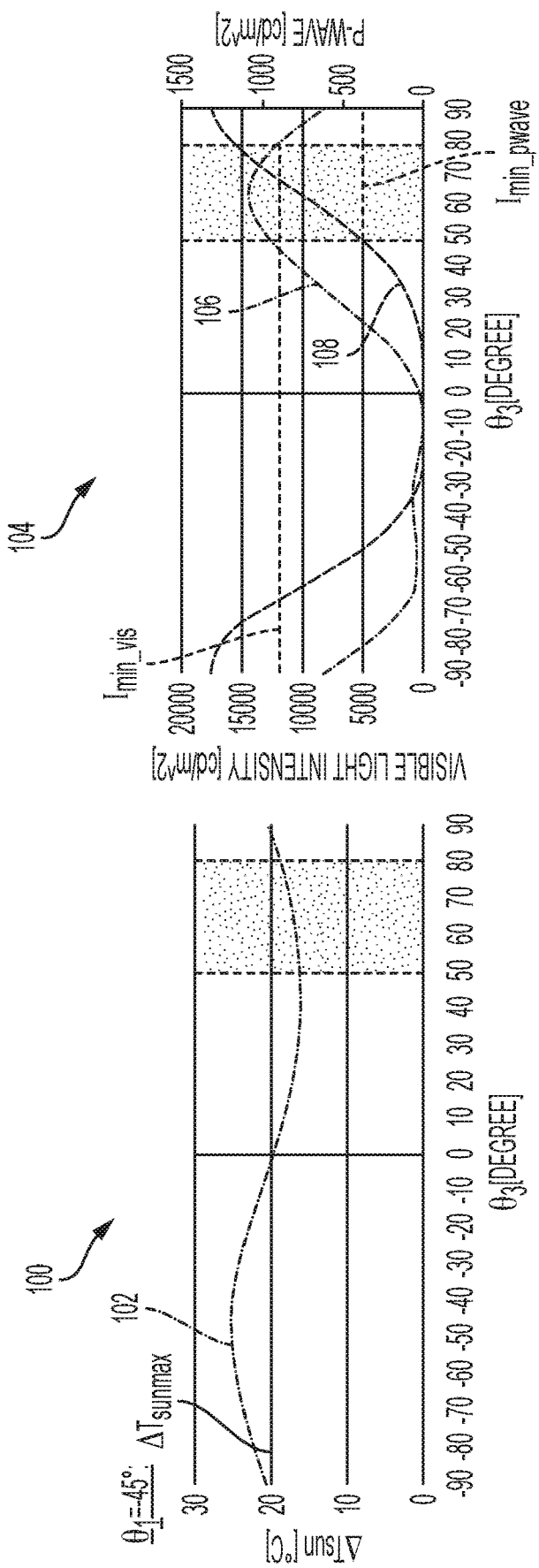
FIGS. 4-6 illustrate the temperature increase in the liquid crystal display of the head-up display device resulting from thermal load the Sun places on the liquid crystal display and the light intensity of the virtual image being output from the projector of the head-up display device at various orientations of the polarizing axes of the polarizers that are utilized in the head-up display device.
Figure 5:
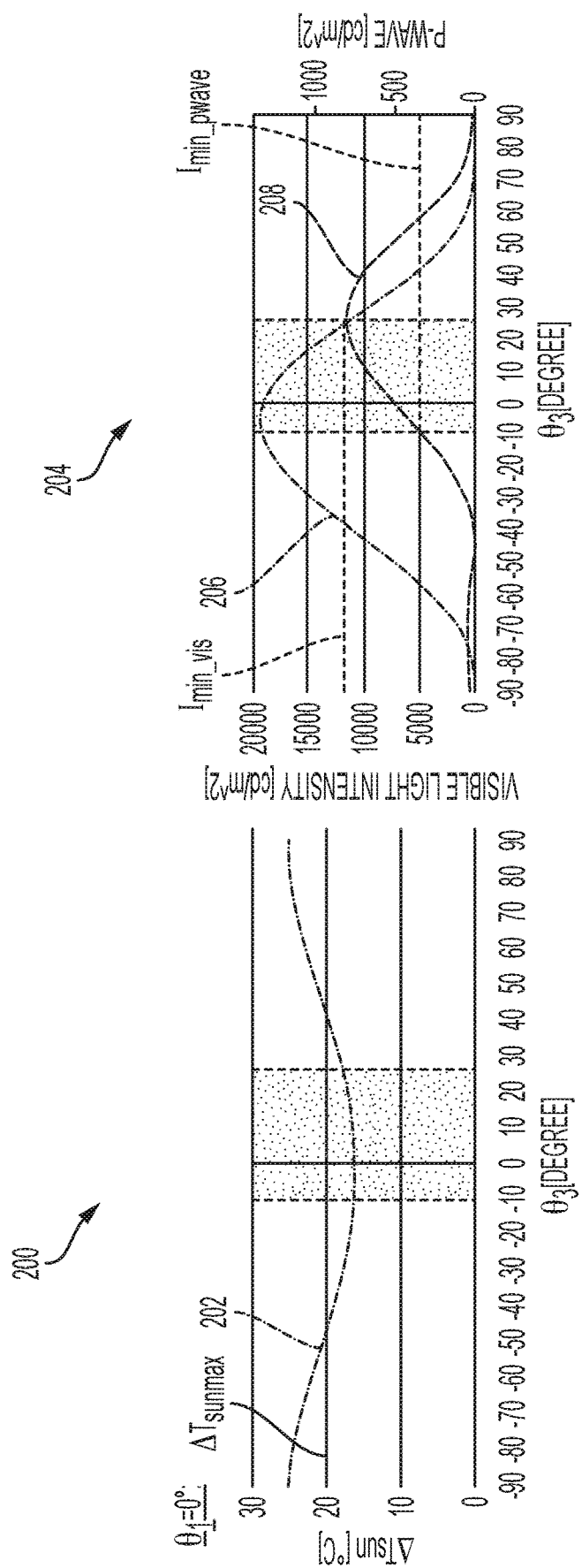
Figure 6:
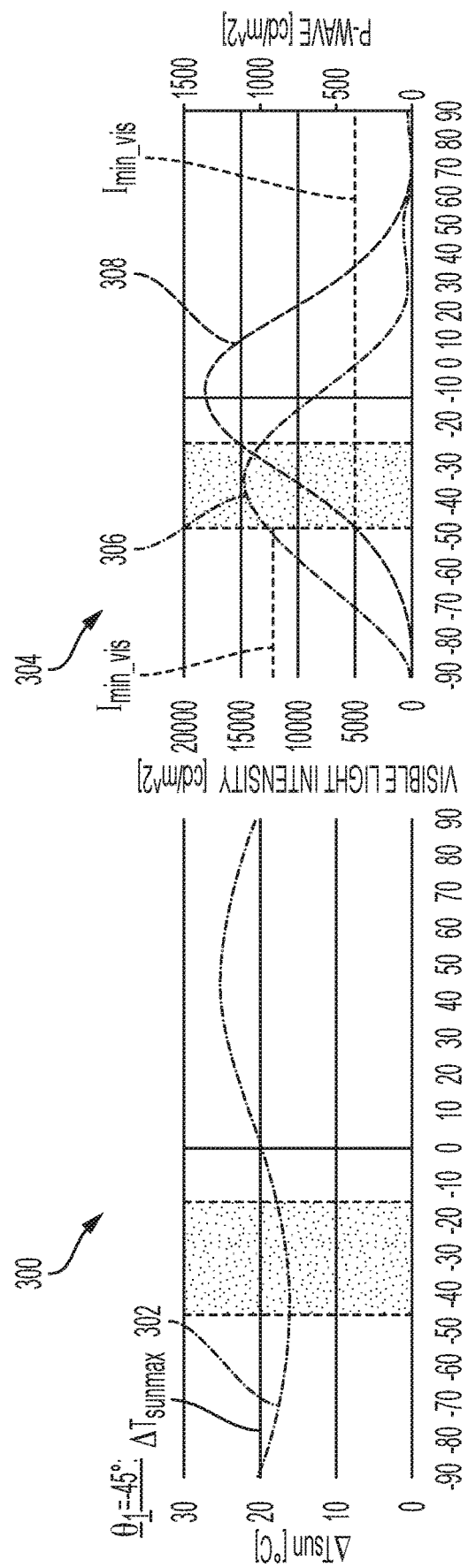

FIGS. 4-6 illustrate the temperature increase in the liquid crystal display 28 of the HUD device 10 resulting from the thermal load the Sun places on the liquid crystal display 28 and the light intensity of the virtual image 14 being output from the projector 20 of the HUD device 10 at various orientations of the polarizing axes of the polarizers 42, 50, 54, 56 that are utilized in the HUD device 10. The graphs represent testing data that was utilized to derive the desired orientations for the first polarization axis 48 of the first polarizing panel 42 (i.e., $\theta_1$), the desired orientations of the second polarization axis 52 of the second polarizing panel 50 (i.e., $\theta_2$), and the desired differences (i.e., $\theta_3$) between the first polarization axis 48 and the second polarizing panel 50 that result in ensuring that the temperature increase of the liquid crystal display 28 that results from the Sun remains below a temperature threshold while the light intensity of the virtual image 14 remains above light intensity thresholds.

FIG. 4 includes a first graph 100 that illustrates the temperature increase, $\Delta T_{sun}$, in the liquid crystal display 28 resulting from thermal load that the Sun places on the liquid crystal display 28 vs. the difference $\theta_3$ between the first angle $\theta_1$ and the second angle $\theta_2$. More specifically, line 102 illustrates the temperature increase, $\Delta T_{sun}$, in the liquid crystal display 28 resulting from thermal load that the Sun places on the liquid crystal display 28 over a range of values of the difference $\theta_3$ between the first angle $\theta_1$ and the second angle $\theta_2$. FIG. 4 includes a second graph 104 that illustrates light intensity of the virtual image 14 in the visible light spectrum and for light that is further filtered outside of the HUD device 10 (i.e., p-wave light) vs. the difference $\theta_3$ between the first angle $\theta_1$ and the second angle $\theta_2$. More specifically, line 106 illustrates the light intensity of the virtual image 14 in the visible light spectrum over the range of values of the difference $\theta_3$ between the first angle $\theta_1$ and the second angle $\theta_2$, while line 108 illustrates the light intensity of the virtual image 14 in the p-wave spectrum over the range of values of the difference $\theta_3$ between the first angle $\theta_1$ and the second angle $\theta_2$.

The data illustrated in the graphs of FIG. 4 was derived from testing with the first polarization axis 48 of the first polarizing panel 42 oriented at an angle of −45° (i.e., $\theta_1 = -45°$) in the counter-clockwise direction relative to the first or horizontal axis 30. At such an orientation of the first polarization axis 48 (i.e., where $\theta_1 = -45°$), in order for the temperature increase, $\Delta T_{sun}$, in the liquid crystal display 28 resulting from thermal load of the Sun to remain below a desired maximum threshold, $\Delta T_{sunmax}$, for the light intensity of the virtual image 14 in the visible light spectrum to remain above a minimum desired threshold, $I_{min\_vis}$, and for the light intensity of the virtual image 14 in the p-wave spectrum to remain above a minimum desired threshold, $I_{min\_pwave}$, the difference $\theta_3$ between the first angle $\theta_1$ and the second angle $\theta_2$, ranges approximately between 50° and 80°.

FIG. 5 includes a first graph 200 that illustrates the temperature increase, $\Delta T_{sun}$, in the liquid crystal display 28 resulting from thermal load that the Sun places on the liquid crystal display 28 vs. the difference $\theta_3$ between the first angle $\theta_1$ and the second angle $\theta_2$. More specifically, line 202 illustrates the temperature increase, $\Delta T_{sun}$, in the liquid crystal display 28 resulting from thermal load that the Sun places on the liquid crystal display 28 over a range of values of the difference $\theta_3$ between the first angle $\theta_1$ and the second angle $\theta_2$. FIG. 5 includes a second graph 204 that illustrates light intensity of the virtual image 14 in the visible light spectrum and for light that is further filtered outside of the HUD device 10 (i.e., p-wave light) vs. the difference $\theta_3$ between the first angle $\theta_1$ and the second angle $\theta_2$. More specifically, line 206 illustrates the light intensity of the virtual image 14 in the visible light spectrum over the range of values of the difference $\theta_3$ between the first angle $\theta_1$ and the second angle $\theta_2$, while line 208 illustrates the light intensity of the virtual image 14 in the p-wave spectrum over the range of values of the difference $\theta_3$ between the first angle $\theta_1$ and the second angle $\theta_2$.

The data illustrated in the graphs of FIG. 5 was derived from testing with the first polarization axis 48 of the first polarizing panel 42 oriented at an angle of 0° (i.e., $\theta_1=0°$) in the counter-clockwise direction relative to the first or horizontal axis 30. At such an orientation of the first polarization axis 48 (i.e., where $\theta_1=0°$, in order for the temperature increase, $\Delta T_{sun}$, in the liquid crystal display 28 resulting from thermal load of the Sun to remain below a desired maximum threshold, $\Delta T_{sunmax}$, for the light intensity of the virtual image 14 in the visible light spectrum to remain above a minimum desired threshold, $I_{min\_vis}$, and for the light intensity of the virtual image 14 in the p-wave spectrum to remain above a minimum desired threshold, $I_{min\_pwave}$, the difference $\theta_3$ between the first angle $\theta_1$ and the second angle $\theta_2$, ranges approximately between −10° and 30°.

FIG. 6 includes a first graph 300 that illustrates the temperature increase, $\Delta T_{sun}$, in the liquid crystal display 28 resulting from thermal load that the Sun places on the liquid crystal display 28 vs. the difference $\theta_3$ between the first angle $\theta_1$ and the second angle $\theta_2$. More specifically, line 302 illustrates the temperature increase, $\Delta T_{sun}$, in the liquid crystal display 28 resulting from thermal load that the Sun places on the liquid crystal display 28 over a range of values of the difference $\theta_3$ between the first angle $\theta_1$ and the second angle $\theta_2$. FIG. 6 includes a second graph 304 that illustrates light intensity of the virtual image 14 in the visible light spectrum and for light that is further filtered outside of the HUD device 10 (i.e., p-wave light) vs. the difference $\theta_3$ between the first angle $\theta_1$ and the second angle $\theta_2$. More specifically, line 306 illustrates the light intensity of the virtual image 14 in the visible light spectrum over the range of values of the difference $\theta_3$ between the first angle $\theta_1$ and the second angle $\theta_2$, while line 308 illustrates the light intensity of the virtual image 14 in the p-wave spectrum over the range of values of the difference $\theta_3$ between the first angle $\theta_1$ and the second angle $\theta_2$.

The data illustrated in the graphs of FIG. 6 was derived from testing with the first polarization axis 48 of the first polarizing panel 42 oriented at an angle of 45° (i.e., $\theta_1=45°$ in the counter-clockwise direction relative to the first or horizontal axis 30. At such an orientation of the first polarization axis 48 (i.e., where $\theta_1=45°$), in order for the temperature increase, $\Delta T_{sun}$, in the liquid crystal display 28 resulting from thermal load of the Sun to remain below a desired maximum threshold, $\Delta T_{sunmax}$, for the light intensity of the virtual image 14 in the visible light spectrum to remain above a minimum desired threshold, $I_{min\_vis}$, and for the light intensity of the virtual image 14 in the p-wave spectrum to remain above a minimum desired threshold, $I_{min\_pwave}$, the difference $\theta_3$ between the first angle $\theta_1$ and the second angle $\theta_2$, ranges approximately between −45° and −15°.

The relative movement of the desirable ranges for the difference $\theta_3$ between FIGS. 4-6, shift to the left as $\theta_1$ increases from −45° to 45°. Therefore, the data and the observed trend may be used to fill in the gaps between the graphs. For example, a desirable range of the difference $\theta_3$ may be between −45° and 80° for a range of the first angle $\theta_1$ that covers the entire span between −45° and 45°, a desirable range of the difference $\theta_3$ may be between −10° and 80° for values of the first angle $\theta_1$ that span between −45° and 0°, and/or a desirable range of the difference $\theta_3$ may be between −45° and 30° for values of the first angle $\theta_1$ that span between 0° and 45°.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle head-up display comprising:
   a liquid crystal panel having opposing input and output surfaces, and configured to form an image oriented relative to a horizontal axis;
   a light source configured to direct light toward the input surface, through the liquid crystal panel, and out of the output surface to project the image onto an interior surface of a vehicle windshield;
   a first polarizing panel secured to the output surface and having a first polarization axis oriented at a first angle in a counter-clockwise direction relative to the horizontal axis; and
   a second polarizing panel disposed between the first polarizing panel and the windshield, and having a second polarization axis oriented at a second angle in the counter-clockwise direction relative to the horizontal axis, wherein a difference between the first angle and the second angle ranges between −45° and 80°.

2. The head-up display of claim 1 further comprising a third polarizing panel secured to the input surface and having a third polarization axis oriented at an angle relative to the horizontal axis that is substantially perpendicular to the first angle.

3. The head-up display of claim 2 further comprising a fourth polarizing panel disposed between the third polarizing panel and the light source, and having a fourth polarization axis oriented at an angle relative to the horizontal axis that is substantially parallel to the third angle.

4. The head-up display of claim 1, wherein the first angle has a value in the counter-clockwise direction relative to the horizontal axis that ranges between −45° and 45°.

5. The head-up display of claim 1, wherein the first angle has a value in the counter-clockwise direction relative to the horizontal axis that ranges between −45° and 0°, and the difference ranges between −10° and 80°.

6. The head-up display of claim 1, wherein the first angle has a value in the counter-clockwise direction relative to the horizontal axis that ranges between 0° and 45°, and the difference ranges between −45° and 30°.

7. The head-up display of claim 1, wherein the liquid crystal panel is a thin-film transistor liquid crystal display.

8. A head-up display projector comprising:
   a liquid crystal panel configured to form an image oriented relative to a horizontal axis;
   a light source configured to direct light through the liquid crystal panel to project the image;
   a first polarizing panel secured to a first exterior surface of the liquid crystal panel, disposed between the liquid crystal panel and an output of the projector, and having a first polarization axis oriented at a first angle in a counter-clockwise direction relative to the horizontal axis; and
   a second polarizing panel disposed between the first polarizing panel and the output of the projector, and having a second polarization axis oriented at a second angle in the counter-clockwise direction relative to the horizontal axis, wherein a difference between the first angle and the second angle ranges between −45° and 80°.

9. The projector of claim 8 further comprising a third polarizing panel secured to a second surface of the liquid crystal panel, disposed between the light source and the liquid crystal panel, and having a third polarization axis oriented at an angle relative to the horizontal axis that is substantially perpendicular to the first angle.

10. The projector of claim 9 further comprising a fourth polarizing panel disposed between the light source and the third polarizing panel, and having a fourth polarization axis oriented at an angle relative to the horizontal axis that is substantially parallel to the third angle.

11. The projector of claim 8, wherein the first angle has a value in the counter-clockwise direction relative to the horizontal axis that ranges between −45° and 45°.

12. The projector of claim 8, wherein the first angle has a value in the counter-clockwise direction relative to the horizontal axis that ranges between −45° and 0°, and the difference ranges between −10° and 80°.

13. The projector of claim 8, wherein the first angle has a value in the counter-clockwise direction relative to the horizontal axis that ranges between 0° and 45°, and the difference ranges between −45° and 30°.

14. The projector of claim 8, wherein the liquid crystal panel is a thin-film transistor liquid crystal display.

15. A vehicle head-up display comprising:
   a thin-film transistor liquid crystal display configured to form an image oriented relative to a first axis;
   a light source configured to direct light through the display to project the image onto a windshield;
   a first polarizing panel overlaying a first exterior surface of the display on an opposing side of the display relative to the light source, and having a first polarization axis oriented at a first angle in a counter-clockwise direction relative to the first axis; and
   a second polarizing panel disposed between the first polarizing panel and the windshield, and having a second polarization axis oriented at a second angle in the counter-clockwise direction relative to the first axis, wherein a difference between the first angle and the second angle in a counter-clockwise direction relative to a first axis ranges between −45° and 80°.

16. The head-up display of claim 15 further comprising a third polarizing panel secured a second exterior surface of the display, disposed between the light source and the display, and having a third polarization axis oriented at an angle relative to the first axis that is substantially perpendicular to the first angle.

17. The head-up display of claim 16 further comprising a fourth polarizing panel disposed between the third polarizing panel and the light source, and having a fourth polarization axis oriented at an angle relative to the first axis that is substantially parallel to the third angle.

18. The head-up display of claim 15, wherein the first angle has a value in the counter-clockwise direction relative to the first axis that ranges between −45° and 45°.

19. The head-up display of claim 15, wherein the first angle has a value in the counter-clockwise direction relative to the first axis that ranges between −45° and 0°, and the difference ranges between −10° and 80°.

20. The head-up display of claim 15, wherein the first angle has a value in the counter-clockwise direction relative to the first axis that ranges between 0° and 45°, and the difference ranges between −45° and 30°.

* * * * *

UNITED STATES PATENT AND TRADEMARK OFFICE
CERTIFICATE OF CORRECTION

| | |
|---|---|
| PATENT NO. | : 10,712,558 B2 |
| APPLICATION NO. | : 16/222540 |
| DATED | : July 14, 2020 |
| INVENTOR(S) | : Austin Simpson et al. |

It is certified that error appears in the above-identified patent and that said Letters Patent is hereby corrected as shown below:

In the Claims

Column 10, Line 29, Claim 16:
After "third polarizing panel secured"
Insert -- to --.

Signed and Sealed this
Sixth Day of October, 2020

Andrei Iancu
*Director of the United States Patent and Trademark Office*